United States Patent
Huang et al.

(10) Patent No.: US 11,102,468 B2
(45) Date of Patent: Aug. 24, 2021

(54) LIGHT EMITTING DEVICE AND IMAGE CAPTURING DEVICE USING SAME

(71) Applicant: TRIPLE WIN TECHNOLOGY(SHENZHEN) CO. LTD., Shenzhen (CN)

(72) Inventors: Chun-Yao Huang, New Taipei (TW); Cheng-An Lin, New Taipei (TW)

(73) Assignee: TRIPLE WIN TECHNOLOGY(SHENZHEN) CO.LTD., Shenzhen (CN)

( * ) Notice: Subject to any disclaimer, the term of this patent is extended or adjusted under 35 U.S.C. 154(b) by 136 days.

(21) Appl. No.: 16/507,319

(22) Filed: Jul. 10, 2019

(65) Prior Publication Data
US 2020/0382761 A1    Dec. 3, 2020

(30) Foreign Application Priority Data
May 27, 2019   (CN) .......................... 201910445101.2

(51) Int. Cl.
| H04N 13/254 | (2018.01) |
| G02B 26/08 | (2006.01) |
| H04N 5/33 | (2006.01) |
| H04N 13/207 | (2018.01) |

(52) U.S. Cl.
CPC ....... *H04N 13/254* (2018.05); *G02B 26/0833* (2013.01); *H04N 5/33* (2013.01); *H04N 13/207* (2018.05)

(58) Field of Classification Search
CPC ...... H04N 13/254; H04N 13/207; H04N 5/33; G02B 26/0833
See application file for complete search history.

(56) References Cited

U.S. PATENT DOCUMENTS

| 9,690,092 B2 | 6/2017 | Freedman et al. | |
| 2003/0112507 A1* | 6/2003 | Divelbiss | G02B 30/23 359/464 |
| 2005/0237495 A1* | 10/2005 | Peterson | G03B 21/208 353/94 |

(Continued)

FOREIGN PATENT DOCUMENTS

| CN | 101477246 | 7/2009 |
| CN | 107677218 | 2/2018 |

(Continued)

OTHER PUBLICATIONS

Riddick, B.C. et al., "Photocathode quantum efficiency mapping at high resolution using a digital micromirror device", Phys. Rev. ST Accel. Beams 16, 062802, pp. 1-4 (Year: 2013).*

*Primary Examiner* — Blake C Riddick
(74) *Attorney, Agent, or Firm* — ScienBiziP, P.C.

(57) ABSTRACT

A light emitting device and an image capturing device using the light emitting device. The light emitting device includes a light emitting element, a digital micro mirror (DMD), a reflecting prism, and a housing. The light from the light emitting element is modulated by the DMD into structured light. The reflecting prism is on an optical path of the source light. The reflecting prism guides the source light to the DMD. The housing defines a receiving cavity. The light emitting element, the reflecting prism, and the DMD are received in the receiving cavity. The housing defines a light exit opening, the structured light exits from the light exit opening.

16 Claims, 6 Drawing Sheets

(56) References Cited

U.S. PATENT DOCUMENTS

| | | | |
|---|---|---|---|
| 2007/0058143 A1* | 3/2007 | Penn | H04N 9/3114 |
| | | | 353/102 |
| 2008/0158532 A1* | 7/2008 | Ishikawa | G03F 7/70275 |
| | | | 355/56 |
| 2009/0021656 A1* | 1/2009 | Ozaki | G03F 7/70291 |
| | | | 349/4 |
| 2009/0185144 A1* | 7/2009 | Grasser | G02B 13/10 |
| | | | 353/81 |
| 2011/0001940 A1* | 1/2011 | Kuroda | G02B 7/02 |
| | | | 353/101 |
| 2012/0026575 A1 | 2/2012 | Cheng et al. | |
| 2015/0198800 A1* | 7/2015 | Freedman | G02B 26/0833 |
| | | | 348/46 |
| 2016/0286183 A1* | 9/2016 | Haraguchi | H04N 9/3152 |
| 2017/0131531 A1* | 5/2017 | Brukilacchio | G02B 17/0868 |
| 2017/0208302 A1* | 7/2017 | Katsumata | G02B 27/0018 |
| 2018/0067308 A1* | 3/2018 | Sakai | H05B 47/105 |
| 2019/0049720 A1* | 2/2019 | Bardagjy | G01B 11/2536 |
| 2019/0166348 A1* | 5/2019 | Kempf | G06T 7/521 |
| 2019/0171096 A1* | 6/2019 | Yamagata | G03B 21/2033 |
| 2020/0084438 A1* | 3/2020 | Avraham | G02B 5/04 |
| 2020/0401048 A1* | 12/2020 | Klimczak | G02B 27/149 |

FOREIGN PATENT DOCUMENTS

| | | |
|---|---|---|
| TW | I269925 B | 1/2007 |
| TW | I427347 B | 2/2014 |
| TW | I651659 B | 2/2019 |

\* cited by examiner

LIGHT EMITTING DEVICE AND IMAGE CAPTURING DEVICE USING SAME

FIELD

The subject matter herein generally relates to optical depth perception, and particularly to a light emitting device and an image capturing device using the light emitting device.

BACKGROUND

Generally, structured light with a specific optical pattern (e.g. laser speckle) is used and projected onto an object to measure depth of a surface of the object. Light emitted from a light source is not originally patterned, and a diffractive optical element (DOE) is usually used to diffract the light emitted from the light source to obtain required pattern. Field of view (FOV) of light diffracted by the diffractive optical element is limited, thus a grating is needed to increase the FOV. However, one specific pattern which is unchangeable can be created by using the diffractive optical element. Such a method of producing structure light is limiting and un-flexible.

In addition, the light source is usually a conventional side-emitting laser, as shown in FIG. 1. In FIG. 1, spikes "a" through "g" indicate wavelengths of light from the conventional side-emitting laser at 0 degree Celsius, 10 degree Celsius, 20 degree Celsius, 30 degree Celsius, 40 degree Celsius, 50 degree Celsius, and 60 degree Celsius, respectively. It can be seen that the wavelength of light from the conventional side-emitting laser varies with temperature by about 0.03 nm per degree Celsius. As the temperature changes, the wavelength of light from the conventional side-emitting laser changes correspondingly. The accuracy of the emission of the structured light can thus be reduced.

BRIEF DESCRIPTION OF THE DRAWINGS

Implementations of the present technology will now be described, by way of embodiments only, with reference to the attached figures.

DETAILED DESCRIPTION

Figure 1:
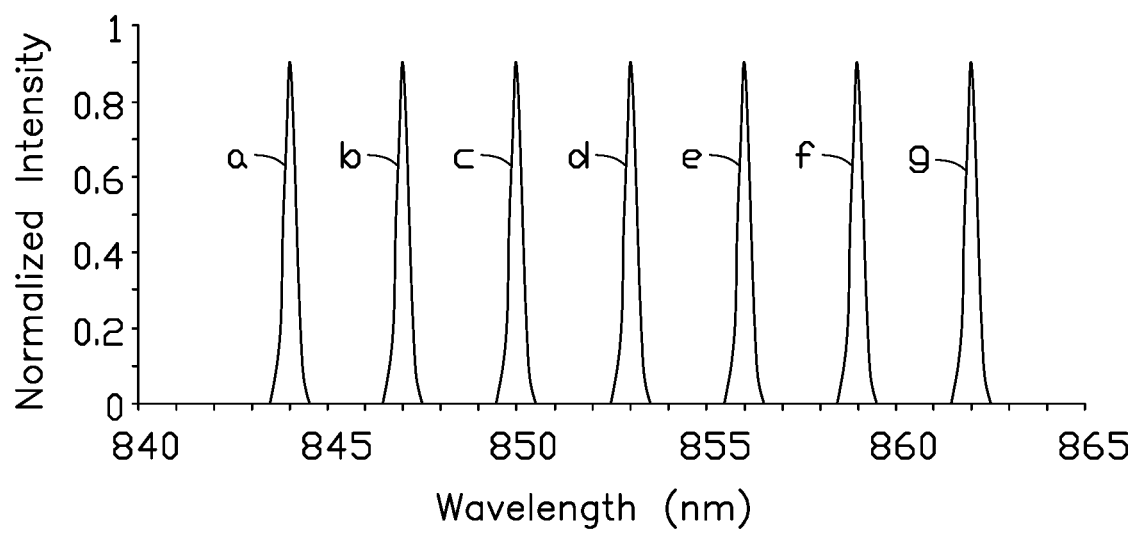
FIG. 1 is a graph showing wavelengths of laser beams emitted from a conventional side-emitting laser at different temperatures, wherein the abscissa indicates the wavelength of the laser beam, the ordinate indicates the normalized intensity of the laser beam.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 2:
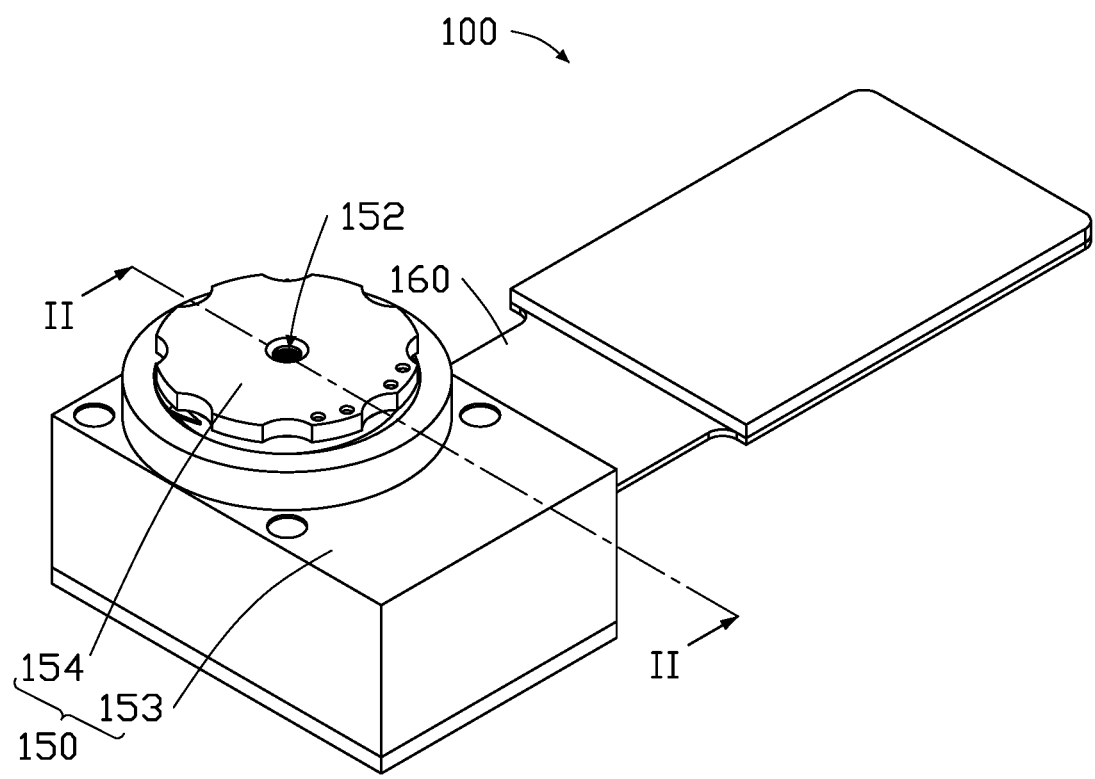
FIG. 2 is an isometric view of a light emitting device according to an embodiment of the present disclosure.
Figure 3:
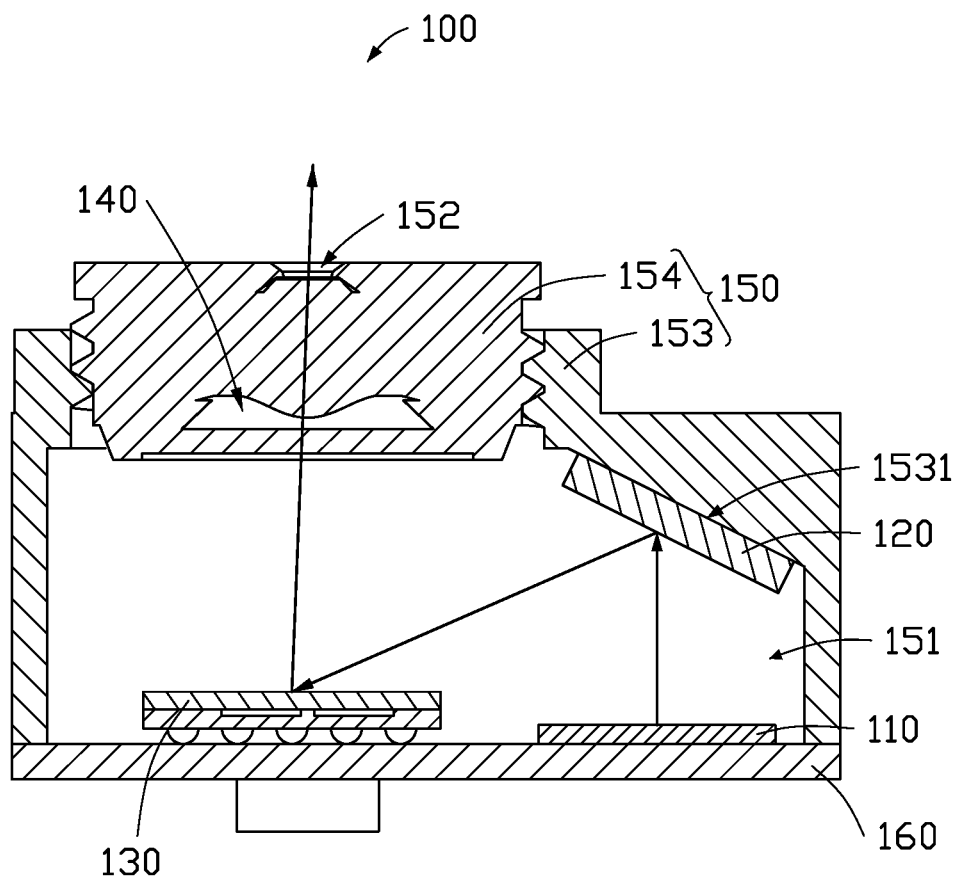
FIG. 3 is a cross-sectional view along line II-II of FIG. 2.
Figure 4:
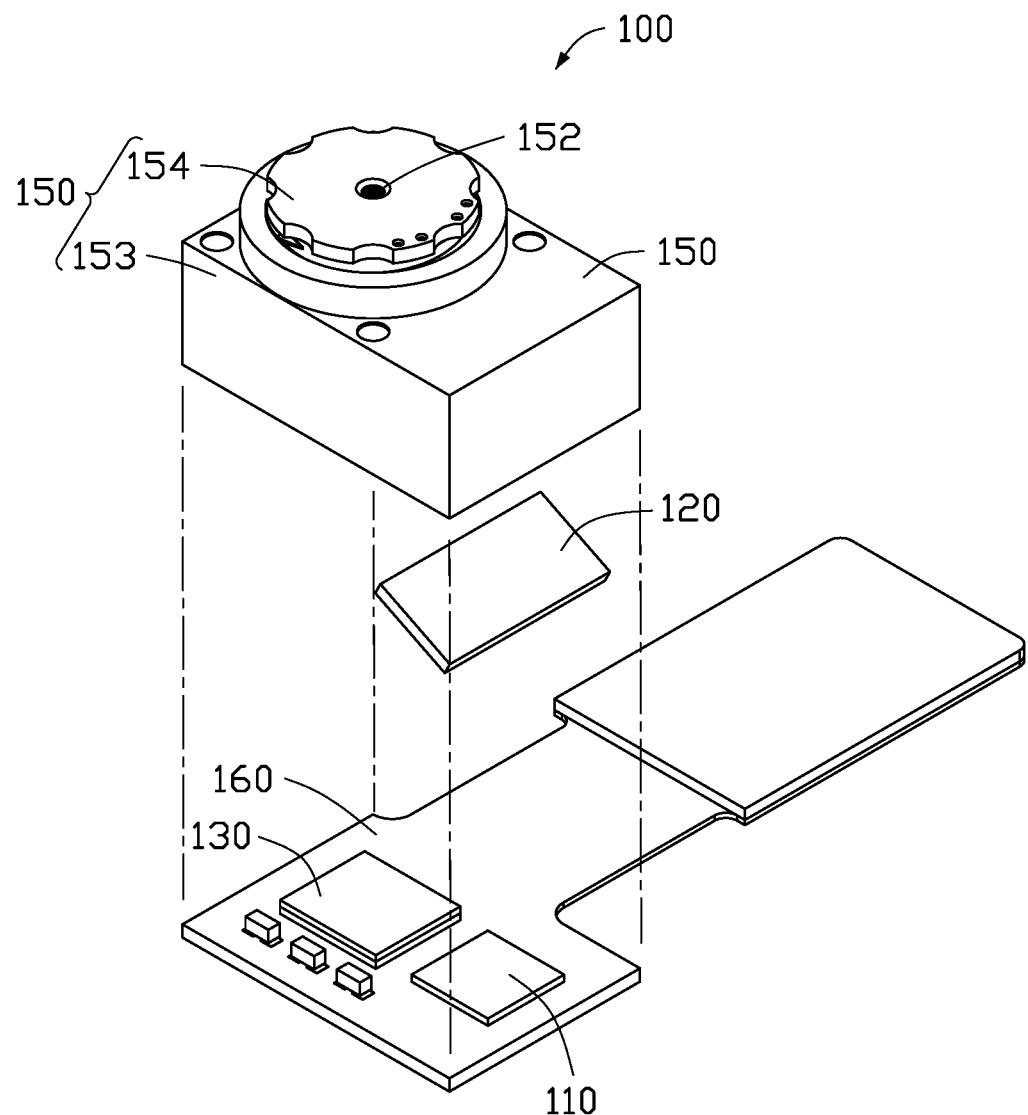
FIG. 4 is an exploded view of the light emitting device in FIG. 2.

Referring to FIGS. 2 through 4, a light emitting device 100 includes a light emitting element 110, a reflecting prism 120, a digital micro-mirror device (DMD) 130, and a housing 150. The light emitting element 110 is the source of light. The reflecting prism 120 is configured to guide the light from the source to the DMD 130. The DMD 130 is configured to modulate the light into structured light. The housing 150 defines a receiving cavity 151. The light emitting element 110, the reflecting prism 120, and the DMD 130 are received in the receiving cavity 151. The housing 150 defines a light exit opening 152, and the structured light exits from the light exit opening 152.

Referring to FIG. 3, the housing 150 includes a lens barrel 154 and a lens holder 153. The lens barrel 154 and the lens holder 153 are threaded together. The light exit opening 152 is on an exit optical axis of the lens barrel 154.

Referring to FIG. 3, the light emitting device 100 further includes at least one lens 140. The lens 140 is on an optical path of the structured light and configured to collimate the structured light before the structured light reaches the light exit opening 152. After being collimated by the lens 140, the structured light from the DMD 130 exits from the light exit opening 152 along the exit optical axis of the lens barrel 154. The shape and number of the lens 140 can be designed according to actual requirements.

Referring to FIGS. 2 through 4, the light emitting device 100 further includes a circuit board 160. Part of the circuit board 160 is on a side of the housing 150 opposite to the light exit opening 152. The circuit board 160 and the housing 150 cooperatively define the receiving cavity 151. The light emitting element 110 and the DMD 130 are electrically connected to the circuit board 160. In one embodiment, the circuit board 160 is a rigid flex printed circuit (RFPC) board.

In one embodiment, the light emitting element 110 may be an infrared laser diode chip, which includes a plurality of infrared laser diodes or an infrared light emitting diode chip, which includes a plurality of infrared light emitting diodes. In the present embodiment, the infrared laser diode chip is a chip of vertical cavity surface-emitting laser (VCSEL). The VCSEL needs less driving voltage and current, thus having a lower power consumption. Adjustability of frequency of the VCSEL is high, which can reach several GHz. Manufacturing of the VCSEL is compatible with semiconductor manufacturing process, so the VCSEL is suitable for mass integrated manufacturing. In addition, a variation of the wavelength of light from the VCSEL with temperature is only about 0.07 nm per degree Celsius. Therefore, the VCSEL is advantageous for enhancing the accuracy of the emission of the structured light.

Referring to FIG. 3, the reflecting prism 120 is secured to an inner surface 1531 of the housing 150. Relative positions of the DMD 130 and the light emitting element 110 and relative inclined angles of the reflecting prism 120 and the light emitting element 110 are both adjustable so that the source light reflected by the reflecting prism 120 emits to the DMD 130. In one embodiment, the reflecting prism 120 is a plane mirror. The exit direction of the light source light reflected by the reflecting prism 120 can be changed by adjusting the relative inclination angles.

In one embodiment, the housing 150 may be made of a metal material such as copper, aluminum, iron, or stainless steel to facilitate heat dissipation and further improves thermal saturation caused by excessive light emitting temperature of the light emitting element 110. The thermal saturation means that the light emitting intensity of the light emitting element 110 no longer increases significantly or may even decrease with an increase of the working current. In addition, the housing 150 is electrically insulated from the light emitting element 110, so the housing 15 may be made of metal treated by anodization (e.g., black anodization). In other embodiments, in order to reduce the manufacturing cost, the housing 150 may also be made of plastic.

Figure 5:
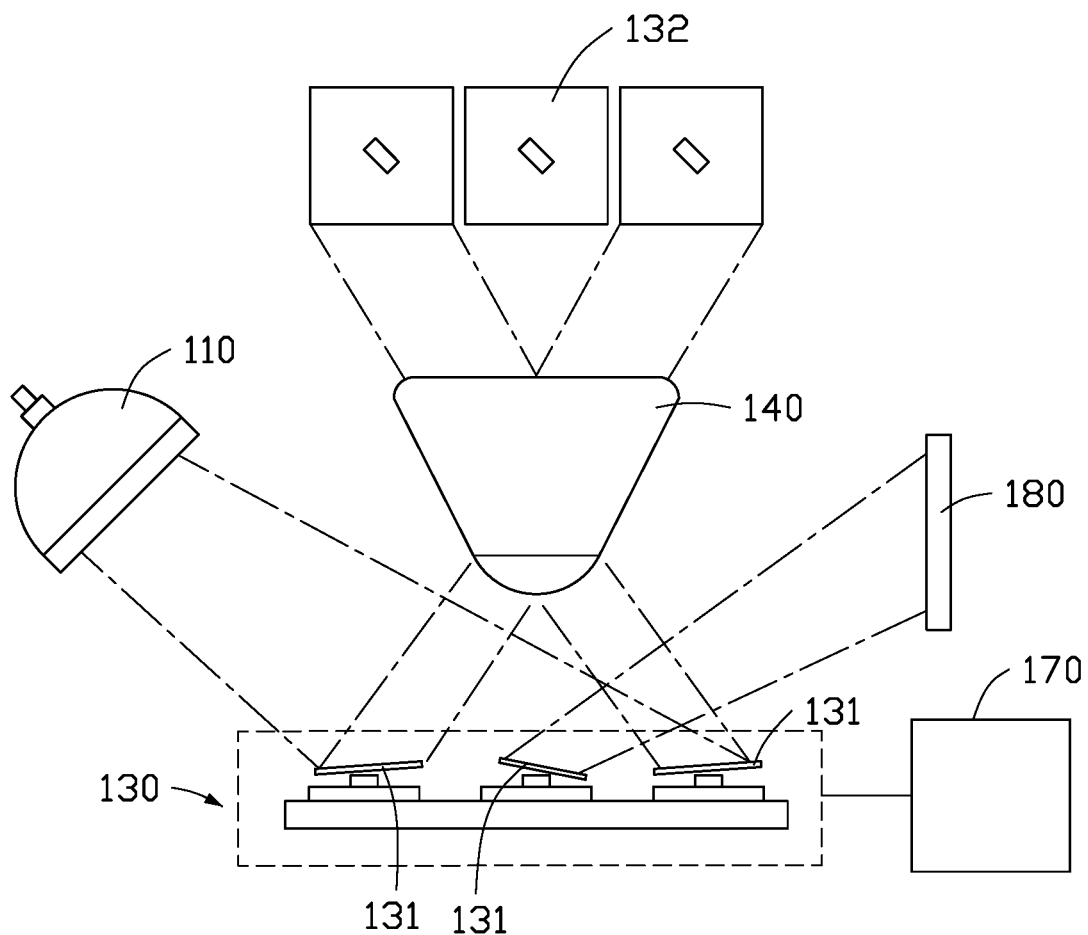
FIG. 5 is a schematic view of operating principle of a digital micro-mirror device (DMD) of the light emitting device.

Referring to FIG. 5, the DMD 130 includes a plurality of micromirrors 131 spaced apart from each other and arranged to be in an array of rows and columns. A plurality of pixels 132 is also included, each of the micromirrors 131 corresponds to one pixel 132. Each micromirror 131 guides the source light to obtain structured light of the preset pattern. The number of the micromirrors 131 can be as desired. The greater the number of micromirrors 131, the higher will be the resolution of the pattern of the obtained structured light. On the contrary, the smaller the number of micromirrors 131, the lower will be the resolution of the pattern.

As shown FIG. 5, the light emitting device 100 further includes a light absorbing element 180. The light absorbing element 180 is made of non-reflecting material, and is located inside the lens holder 153 (not shown). The light absorbing element 180 and the light exit opening 152 are on different optical paths of the DMD 130. Each of the micromirrors 131 can selectively reflect the source light from the light emitting element 110 to the light exit opening 152 or to the light absorbing element 180. The "on" and "off" states of each of the micromirrors 131 correspond to the "bright" and "dark" states of one pixel 132. Each of the micromirrors 131 in the "on" state reflects the light source to the light exit opening 152 such that its corresponding pixel 132 is in the "bright" state. Each of the micromirrors 131 in the "off" state reflects the source light to the light absorbing element 180 such that its corresponding pixel 132 is in the "dark" state. Each of the micromirrors selectively guides the source light to obtain structured light of the preset pattern, so the light emitting device 100 can project structured light of the preset pattern according to applications. In one embodiment, the preset pattern may have different light intensity distributions and/or different patterns (e.g., a linear pattern or a speckled pattern).

Referring to FIG. 5, the light emitting device 100 further includes a control device 170. The control device 170 is configured to transmit an optical modulation signal to the DMD 130 according to the preset pattern. The DMD 130 adjusts deflection states of each of the micromirrors 131 according to the optical modulation signal to reflect the source light to the light exit opening 152 or the light absorbing element 180.

Compared with diffractive optical elements, the DMD 130 can modulate the source light into structured light of the preset pattern. Thereby, the practicality and flexibility of the light emitting device 100 using the DMD 130 are improved.

Figure 6:
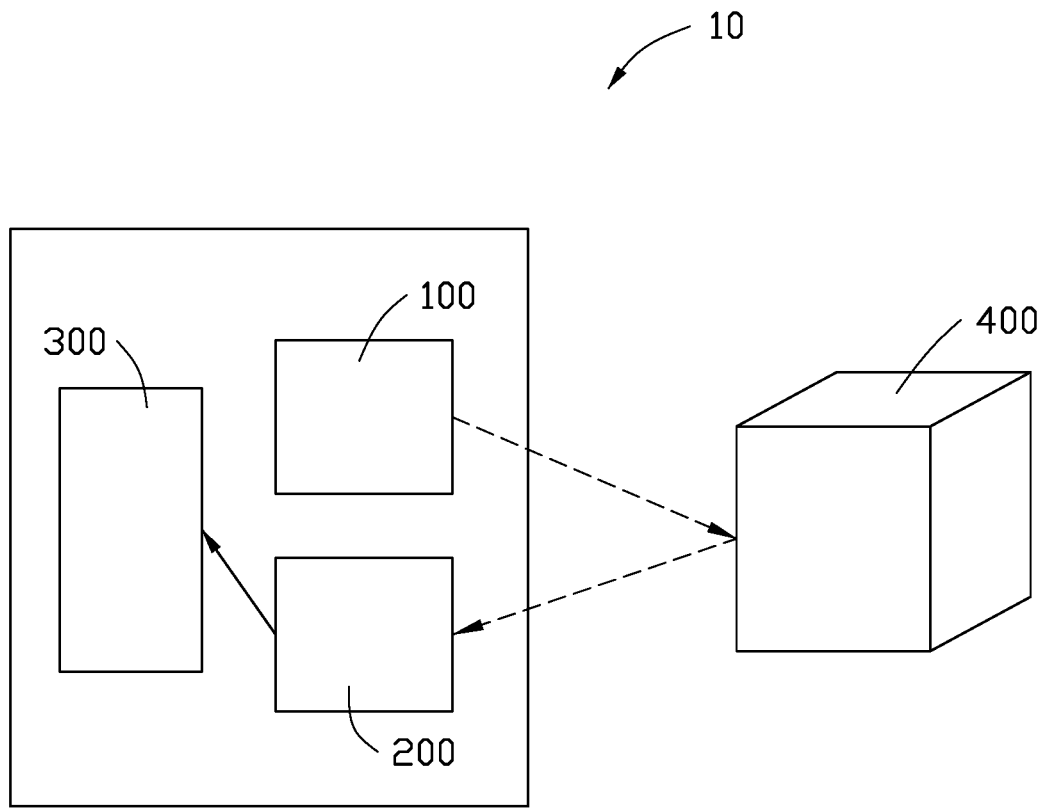
FIG. 6 is a schematic view of operating principle of an image capturing device using the light emitting device.

Referring to FIG. 6, an image capturing device 10 using the light emitting device 100 is shown. The light emitting device 100 is configured to emit structured light onto an object 400. The image capturing device 10 further includes an image sensor 200 and an image processor 300. The image sensor 200 is configured to generate a structured light image according to the structured light reflected by the object 400. The image processor 300 is configured to calculate location information and depth information of the object 400 from the structured light image and to create a three-dimensional stereoscopic image of the object 400. In one embodiment, the image sensor 200 may be a charge coupled device (CCD) or a complementary metal-oxide semiconductor (CMOS).

The light emitting device 100 emits structured light having a predetermined pattern to the object 400. The image sensor 200 captures light reflected by the object 400 and generates a structured light image according to the light reflected. The image processor 300 calculates position information and depth information of the object 400 based on the structured light image, and creates the three-dimensional stereoscopic image of the object 400. In one embodiment, the object 400 may be a human face.

The light emitting device 100 and the image capturing device 10 have compact sizes and can be used in portable mobile devices such as mobile phones. The light emitting device 100 and the image capturing device can be applied to the fields of three-dimensional scanning and face recognition.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A light emitting device, comprising:
   a light emitter configured to emit source light;
   a digital micro-mirror device (DMD) configured to modulate the source light into structured light;
   a reflecting prism on an optical path of the source light, the reflecting prism being configured to guide the source light to the DMD;
   a housing defining a receiving cavity, wherein the light emitter, the reflecting prism, and the DMD are received in the receiving cavity, the housing defines a light exit opening configured for the structured light to exit; and
   at least one lens on an optical path of the structured light, wherein the at least one lens is configured to collimate the structured light before the structured light reaches the light exit opening.

2. The light emitting device of claim 1, wherein the light emitter is an infrared laser chip or an infrared light emitting diode chip.

3. The light emitting device of claim 2, wherein the infrared laser chip is a chip of vertical cavity surface emitting laser.

4. The light emitting device of claim 1, further comprising a circuit board, the circuit board and the housing cooperatively defining the receiving cavity, and both the light emitter and the DMD being electrically connected to the circuit board.

5. The light emitting device of claim 1, wherein the reflecting prism is secured to an inner surface of the housing, and relative positions of the DMD and the light emitter and relative inclined angles of the reflecting prism and the light emitter are adjustable so that the source light reflected by the reflecting prism emits to the DMD.

6. The light emitting device of claim 1, wherein the DMD comprises a plurality of micromirrors spaced apart from each other, each of the plurality of micromirrors corresponds to one of a plurality of pixels of a preset pattern, and is configured to selectively guide the source light to obtain the structured light of the preset pattern.

7. The light emitting device of claim 6, further comprising a control device, the control device is configured to transmit an optical modulation signal to the DMD according to the preset pattern, the DMD adjusts deflection states of each of the plurality of micromirrors according to the optical modulation signal.

8. The light emitting device of claim 1, wherein the housing is made of metal processed by anodization or plastic material.

9. An image capturing device, comprising:
a light emitting device configured to emit structured light onto an object, the light emitting device comprising:
a light emitter configured to emit source light;
a digital micro-mirror device (DMD) configured to modulate the source light into structured light;
a reflecting prism on an optical path of the source light, the reflecting prism being configured to guide the source light to the DMD;
a housing defining a receiving cavity, wherein the light emitter, the reflecting prism, and the DMD are received in the receiving cavity, the housing defines a light exit opening configured for the structured light to exit;
at least one lens on an optical path of the structured light, wherein the at least one lens is configured to collimate the structured light before the structured light reaches the light exit opening;
an image sensor configured to generate a structured light image according to the structured light reflected by the object; and
an image processor configured to calculate location information and depth information of the object from the structured light image and to create a three-dimensional stereoscopic image of the object.

10. The image capturing device of claim 9, wherein the light emitter is an infrared laser or an infrared light emitting diode.

11. The image capturing device of claim 10, wherein the infrared laser is a vertical cavity surface emitting laser.

12. The image capturing device of claim 9, further comprising a circuit board, the circuit board and the housing cooperatively defining the receiving cavity, and both the light emitter and the DMD are electrically connected to the circuit board.

13. The image capturing device of claim 9, wherein the reflecting prism is secured to an inner surface of the housing, and relative position of the DMD and the light emitter and relative inclined angles of the reflecting prism and the light emitter are adjustable so that the source light reflected by the reflecting prism emits to the DMD.

14. The image capturing device of claim 9, wherein the DMD comprises a plurality of micromirrors spaced apart from each other, each of the plurality of micromirrors corresponds to one of a plurality of pixels of a preset pattern, and is configured to selectively guide the source light to obtain the structured light of the preset pattern.

15. The image capturing device of claim 14, further comprising a control device, the control device is configured to transmit an optical modulation signal to the DMD according to the preset pattern, the DMD adjusts deflection states of each of the plurality of micromirrors according to the optical modulation signal.

16. The image capturing device of claim 9, wherein the housing is made of metal processed by anodization or plastic material.

* * * * *